US012674385B2

(12) United States Patent
Saumya et al.

(10) Patent No.: US 12,674,385 B2
(45) Date of Patent: Jul. 7, 2026

(54) PROCESSES FOR MONITORING CORROSION AND CARRYING OUT OPERATIONAL PLANS USING SAME

(71) Applicant: Schlumberger Technology Corporation, Sugar Land, TX (US)

(72) Inventors: Sachit Saumya, Clamart (FR); Apoorva Kumar, Dhahran (SA); Wael Abdallah, Dhahran (SA); Duaa Abdrabalamir Alsenan, Dhahran (SA); Ali Hussein Al Ali, Dhahran (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 389 days.

(21) Appl. No.: 18/483,330

(22) Filed: Oct. 9, 2023

(65) Prior Publication Data

US 2025/0116185 A1 Apr. 10, 2025

(51) Int. Cl.
E21B 47/00 (2012.01)
G06N 20/00 (2019.01)

(52) U.S. Cl.
CPC ............ E21B 47/006 (2020.05); G06N 20/00 (2019.01); Y10S 138/06 (2013.01)

(58) Field of Classification Search
CPC ...... E21B 47/006; G06N 20/00; Y10S 138/06
See application file for complete search history.

(56) References Cited

U.S. PATENT DOCUMENTS

| | | |
|---|---|---|
| 7,027,928 B2 | 4/2006 | DiFoggio |
| 7,236,886 B2 | 6/2007 | Frenkel |
| 7,755,354 B2 | 7/2010 | Akkurt |
| 8,843,319 B2 | 9/2014 | Hanna |
| 9,429,012 B2 | 8/2016 | Ahmad |

(Continued)

FOREIGN PATENT DOCUMENTS

| | | | | |
|---|---|---|---|---|
| CN | 103455682 A | * | 12/2013 | |
| CN | 115359015 A | * | 11/2022 | ........... G06T 7/0004 |
| WO | WO-2024069216 A1 | * | 4/2024 | ............. G06F 30/27 |

OTHER PUBLICATIONS

Dallag et al., âDigital Solution to Extend the Life of Wells with Continuous Corrosion Monitoring Based on Machine Learning Algorithmsâ 2022, International Petroleum Technology Conference (Year: 2022).*

(Continued)

*Primary Examiner* — John C Kuan
(74) *Attorney, Agent, or Firm* — Jeffrey D. Frantz

(57) ABSTRACT

Processes for monitoring downhole corrosion and directing operational plans using same. In some embodiments, the process can include acquiring a plurality of corrosion factors for at least one well. The process can also include acquiring a plurality of corrosion loss logs for the at least one well. The plurality of corrosion factors and the plurality of corrosion loss logs can be provided to a repository. The repository can be provided to a machine learning model to generate a corrosion prediction. At least the plurality of corrosion factors, the plurality of corrosion loss logs, and the corrosion prediction can be combined into a user dashboard. The user dashboard can be used to determine an operational plan for the at least one well. The determined operational plan for the at least one well can be carried out.

17 Claims, 2 Drawing Sheets

(56) References Cited

U.S. PATENT DOCUMENTS

| | | | |
|---|---|---|---|
| 10,400,590 B1 | 9/2019 | Aldred | |
| 11,578,585 B2 | 2/2023 | Al-Huwaider | |
| 12,153,004 B1 | 11/2024 | He | |
| 12,259,517 B2 | 3/2025 | Wang | |
| 12,360,278 B2 | 7/2025 | Abdallah | |
| 12,429,472 B2 | 9/2025 | Di Santo | |
| 2008/0221800 A1 | 9/2008 | Gladkikh | |
| 2010/0187412 A1 | 7/2010 | Grant | |
| 2010/0201357 A1 | 8/2010 | Ogawa | |
| 2014/0114576 A1 | 4/2014 | Jain | |
| 2014/0278148 A1* | 9/2014 | Ziegel | F17D 5/005 |
| | | | 702/34 |
| 2015/0015250 A1 | 1/2015 | Gzara | |
| 2016/0178545 A1 | 6/2016 | Donaldson | |
| 2017/0145285 A1 | 5/2017 | Lafitte | |
| 2018/0275307 A1 | 9/2018 | Pan | |
| 2020/0264116 A1 | 8/2020 | Gawankar | |
| 2022/0035065 A1 | 2/2022 | Tang | |
| 2022/0035066 A1 | 2/2022 | Zhang | |
| 2023/0109189 A1 | 4/2023 | Abdallah | |
| 2024/0175857 A1 | 5/2024 | Di Santo | |
| 2024/0402383 A1 | 12/2024 | Tang | |
| 2024/0426741 A1* | 12/2024 | Al-Khaldi | G06N 20/00 |
| 2025/0036837 A1* | 1/2025 | Alqahtani | G06F 30/27 |
| 2025/0075620 A1 | 3/2025 | Ribeiro Gomes Ansaloni | |
| 2025/0076221 A1 | 3/2025 | Al-Hamad | |
| 2025/0116624 A1 | 4/2025 | Al-Hamad | |

OTHER PUBLICATIONS

Machine translation for CN-115359015-A, downloaded Feb. 2026 (Year: 2026).*

Brown, H. W., Capillary Pressure Investigations. Society of Petroleum Engineers, Petroleum Transations, AIME, vol. 192, Mar. 1, 1951 (8 Pages).

Harrison B. et al., "Saturation Height Methods and Their Impact on Volumetric Hydrocarbon in Place Estimates," SPE-71326, presented at the SPE Annual Technical Conference and Exhibition held in New Orleans, Louisiana, Sep. 30-Oct. 3, 2001 (12 Pages).

Masalmeh, S.K. et al., "Capillary Pressure Characterization of Carbonate Reservoirs: Relationship between Drainage and Imbibition Curves," SCA2006-16, International Symposium of the Society of Core Analysts held in Trondheim, Norway Sep. 12-16, 2006 (16, pages).

Liang L. et al., Estimating In-Situ Relative Permeability and Capillary Pressure From Multiphysics Wireline Measurements. Society of Petrophysicists and Well-Log Analysts, Jun. 2, 2018 (12 Pages).

Omoregie, Z. S., Factors Affecting the Equivalency of Different Capillary Pressure Measurement Techniques. Society of Petroleum Engineers, Mar. 1, 1988 (9 Pages).

Bertels S.P. et al., (2001). Measurement of aperture distribution, capillary pressure, relative permeability, and in situ saturation in a rock fracture using computed tomography scanning. Water Resources Research, 37(3), 649-662.

Hou D. et al., (2016). Experimental investigation of stress-dependency of relative permeability in rock fractures. Transport in Porous Media, 113(3), 567-590.

Lian P. Q. et al., (2012). The characteristics of relative permeability curves in naturally fractured carbonate reservoirs. Journal of Canadian Petroleum Technology, 51(02), 137-142.

Watanabe, N. et al., (2015). New v-type relative permeability curves for two-phase flows through subsurface fractures. Water Resources Research, 51, 2807-2824.

Jain V., et al., Characterization of Underlying Pore and Fluid Structure Using Factor Analysis on NMR Data, SPWLA 54th Annual Logging Symposium (Jun. 22-26, 2013) (16 Pages).

Ramamoorthy, R., et al., A New Workflow for Petrophysical and Textural Evaluation of Carbonate Reservoirs, SPWLA 49th Annual Logging Symposium, (May 25-28, 2008) (15 pages).

Coates, G.R. et al, 1991. The magnetic resonance imaging log characterized by comparison with petrophysical properties and laboratory core data. Paper presented at the SPE Annual Technical Conference and Exhibition, Dallas, Texas, Oct. 6-9, SPE-22723-MS. (9 pages).

Underschultz, J.R. et al., "Estimating formation water salinity from wireline pressure data: Case study in the Vulcan sub-basin". Petroleum Exploration Society of Australia, 285, 2002 (18 pages).

Zuo Julian Y. et al., "A Breakthrough in Accurate Downhole Fluid Sample Contamination Prediction in Real Time." Paper presented at the SPWLA 56th Annual Logging Symposium, Long Beach, California, USA, Jul. 2015 (16 pages).

Saadu Y.K. et al., Petrophysical evaluation and volumetric estimation within Central swamp depobelt, Niger Delta, using 3-D seismic and well logs, Egyptian Journal of Petroleum, vol. 27(4), 531-539 2018.

Ayadiuno C. B., et al., "Investigating Low Resistivity-Low Contrast Resistivity Pay in a Permo-Carboniferous Reservoir, Central Saudi Arabia." SPE-188887-MS Paper presented at the Abu Dhabi International Petroleum Exhibition Conference, Abu Dhabi, UAE, Nov. 2017. (17 pages).

Oifoghe, Stanley. "Challenges in Identifying and Quantifying Hydrocarbons in Thinly Bedded, Laminated, and Low-Resistivity Pay Zones." Paper presented at the Offshore Technology Conference-Asia, Kuala Lumpur, Malaysia, Mar. 2014 (10 pages).

Kyi Ko ko et al., "Fresh Water Conundrum in Oil and Gas Reservoirs of Malaysia." Paper presented at the SPE Asia Pacific Oil and Gas Conference and Exhibition, Perth, Australia, Oct. 2012 (19 pages).

Di Santo, Simone et al., "Enhanced LWD Dielectric Processing with Forward Modelling in Horizontal Wells for Improved Geosteering and Formation Evaluation in Fresh Water and Mixed Salinity Environments." Paper presented at the SPE Annual Technical Conference and Exhibition, Houston, Texas, USA, Oct. 2022 (19 pages).

Zhang, Ping et al., "Deep Dielectric-Based Water Saturation in Freshwater and Mixed Salinity Environments." Paper presented at the SPWLA 62nd Annual Logging Symposium, Virtual Event, May 2021 (11 pages).

Al-Janabi, Yahya T. "Monitoring of Downhole Corrosion: An Overview." Paper presented at the SPE Saudi Arabia Section Technical Symposium and Exhibition, Al-Khobar, Saudi Arabia, May 2013 (11 pages).

Chen, Tao et al., "Evaluation of Corrosion Inhibitor Batch Treatment Using Newly Developed Downhole Monitoring Tool in Sour Gas Wells." Paper presented at the SPE Conference at Oman Petroleum Energy Show, Muscat, Oman, Mar. 2022 (11 pages).

Amyx J.W. et al., Petroleum Reservoir Engineering—Physical properties. McGraw-Hill Book Company, (1960), pp. 142-160.

Al-Obaidi Sudad et al., 2020. Investigation of Thermal Properties of Reservoir Rocks at Different Saturation, International Research Journal of Modernization in Engineering Technology and Science, vol. 2/13-17.

Beck A.E., 1965. Techniques of measuring heat flow on land, Terrestrial Heat Flow. Lee, W.H.K., ed., American Geophysical Union Monograph No. 8, p. 24-57.

Beck, J.M. et al., 1965. Computing thermal conductivities of rocks from chips and conventional specimens. Journal of Geophysical Research, v. 70, p. 5227-5239.

Birch Francis, 1950. Flow of heat in the Front Range. Colorado, Geological Society of America Bulletin, v. 61, p. 567-630.

C. Robertson, 1988. Thermal Properties of Rocks. Geological Society of America, Open-File Report 88-441.(110 pages).

Clark S. P. Jr., 1966. Handbook of physical constants. Geological Society of America Memoir 97, p. 587.

Diment et al., 1988. Thermal conductivity of some rock-forming minerals: a tabulation. U.S. Geological Survey, open-file report—88-690 (16 pages).

Fuchs et al., (2013). Evaluation of common mixing models for calculating bulk thermal conductivity of sedimentary rocks: Correction charts and new conversion equations. Geothermics. 47. 40-52. 10.1016/j.geothermics.2013.02.002 (15 pages).

(56) References Cited

OTHER PUBLICATIONS

Horai Ki-iti, 1971. Thermal conductivity of rock-forming minerals. Journal of Geophysical Research, v. 76, p. 1278-1308.

Lin et al., (2014). Thermal conductivities, thermal diffusivities, and volumetric heat capacities of core samples obtained from the Japan Trench Fast Drilling Project (JFAST). Earth Planet Sp 66, 48 (11 pages).

Robertson E.C. et al., 1974. Thermal conductivity of vesicular basalt from Hawaii. Journal of Geophysical Research, v. 79, p. 4875-4888.

Sass J.H. et al., 1971, Thermal conductivity of rocks from measurements on fragments and its application to heat-flow determinations. Journal of Geophysical Research, v. 76, p. 3391-3401.

Zimmerman R. (1989). Thermal conductivity of fluid-saturated rocks. Journal of Petroleum Science and Engineering—J Pet Sci Engineering. 3. 219-227.

Batchelder et al., 1998. Rapid, Accurate Phase Quantification of Clay-Bearing Samples using a Position-Sensitive X-Ray Detector. Clays Clay Miner. 46, 183-194.

Srodon, 2013. Identification and Quantitative Analysis of Clay Minerals, Elsevier, 5(25-49).

Zhou et al., 2018. XRD based quantitative analysis of clay minerals using reference intensity ratios, mineral intensity factors, Rietveld, and full pattern summation methods: A critical review, Solid Earth Sci., vol. 3, pp. 16-29.

Nshimiyimana et al., 2020. Physico-chemical and mineralogical characterization of clay materials suitable for production of stabilized compressed earth blocks, Constr. Build. Mater., vol. 241, pp. 118097 (33 pages).

Belghazdis et al., 2022. "Quantification of clay minerals from Meknes: Theory and application," 2022 2nd International Conference on Innovative Research in Applied Science, Engineering and Technology (IRASET), Meknes, Morocco, 2022, pp. 1-7.

Duru, O. O. et al., "Modeling Reservoir Temperature Transients and Reservoir-Parameter Estimation Constrained to the Model," SPE reservoir Evaluation Engineering, 2010, pp. 873-883.

Goode, P. A. et al., "Determination of Petrophysical Parameters Using Wireline Logs in Low Salinity Reservoirs", SPE 29272, presented at the SPE Asia Pacific Oil & Gas conference, Kuala Lumpur, 1995, 14 pages.

Ramamoorthy, R., et al., "A New Workflow for Petrophysical and Textural Evaluation of Carbonate Reservoirs", Petrophysics, 2010, vol. 51, No. 1, 15 pages.

* cited by examiner

100

PROCESSES FOR MONITORING CORROSION AND CARRYING OUT OPERATIONAL PLANS USING SAME

FIELD

Embodiments described generally relate to processes for monitoring corrosion. More particularly, such embodiments relate to processes for monitoring downhole corrosion and directing operational plans using same.

BACKGROUND

Current subsurface corrosion monitoring uses EXCEL® based manual workflow to monitor corrosion in individual wells by looking at well-wise interpretation and the results of different logging tools like mechanical, ultrasonic, and/or electromagnetic. This kind of manual workflow is significantly reliant on the expertise and knowledge of a given user and often leads to untimely planning of workover and remedial measures. Further, such manual workflow incorporates a degree of user biasness in terms of the selection of remedial and workover wells.

While user experience plays a critical role, such experience is unable to account for all the factors that can impact the corrosion rate in a given well, which can lead to issues with the planning of remedial and workover operations. Furthermore, manual workflow is unable to monitor corrosion at a field scale. Field scale planning involves the planning of operations and mitigation measures at field-level and can include multi-well studies to understand the different factors affecting corrosion rates that not only require vast field knowledge, but also require a large amount of time to finish the study.

There is a need, therefore, for an improved process for monitoring downhole corrosion that can allow for more efficient scheduling and planning at a field scale level.

SUMMARY

Processes for monitoring downhole corrosion and directing operational plans using same are provided. In some embodiments, the process can include acquiring a plurality of corrosion factors for at least one well. The process can also include acquiring a plurality of corrosion loss logs for the at least one well. The process can also include providing the plurality of corrosion factors and the plurality of corrosion loss logs to a repository. The process can also include providing the repository to a machine learning model to generate a corrosion prediction. The process can also include combining at least the plurality of corrosion factors, the plurality of corrosion loss logs, and the corrosion prediction into a user dashboard. The process can also include using the user dashboard to determine an operational plan for the at least one well, and carrying out the determined operational plan for the at least one well.

In some embodiments, a process for predicting corrosion to complete a new well can include acquiring a plurality of corrosion factors for at least one well. The process can also include acquiring a plurality of corrosion loss logs for the at least one well. The process can also include providing the plurality of corrosion factors and the plurality of corrosion loss logs to a repository. The process can also include providing the repository to a machine learning model to generate a corrosion prediction. The process can also include combining at least the plurality of corrosion factors, the plurality of corrosion loss logs, and the corrosion prediction into a user dashboard. The process can also include using the user dashboard to determine an operational plan for at least one new well. The process can also include completing the at least one new well using the determined operational plan.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments. It is contemplated that elements disclosed in one embodiment can be utilized in other embodiments without specific recitation.

DETAILED DESCRIPTION

Figure 1:
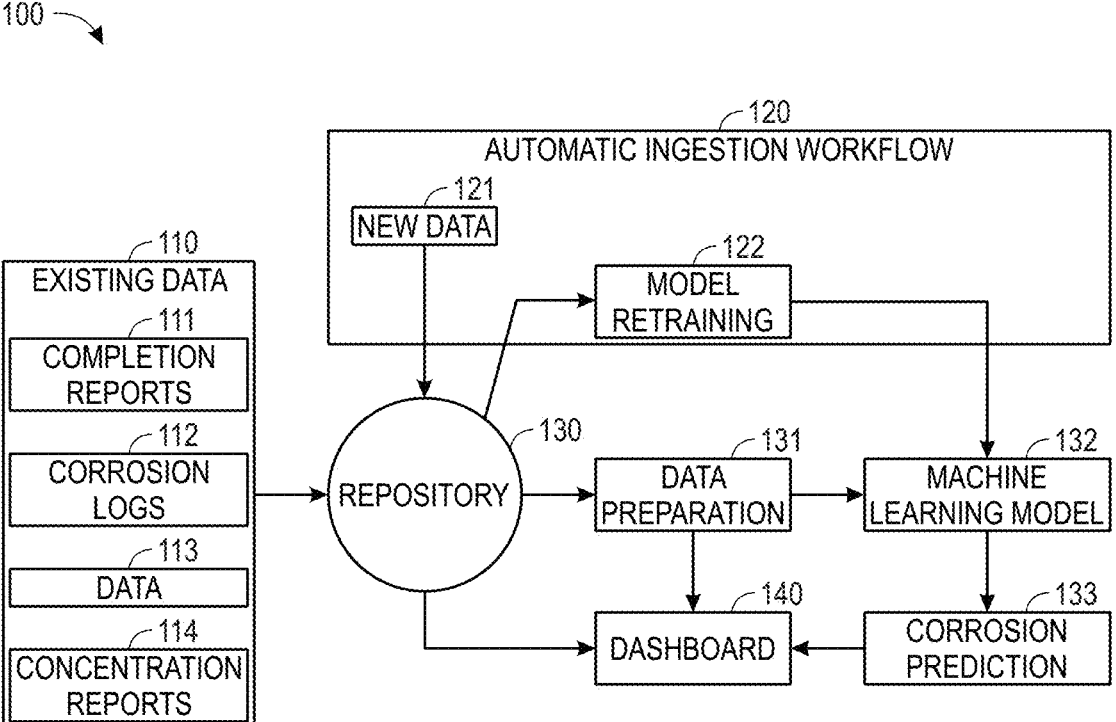
FIG. 1 depicts an illustrative flow diagram of a process for monitoring downhole corrosion, according to one or more embodiments described.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various embodiments and across the figures provided herein. This repetition is for the purpose of simplicity and clarity and does not in itself dictate a relationship between the various embodiments and/or configurations. Moreover, the exemplary embodiments presented below can be combined in any combination of ways, i.e., any element from one exemplary embodiment can be used in any other exemplary embodiment, without departing from the scope of the disclosure.

Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. Additionally, unless otherwise indicated herein, all numerical values are "about" or "approximately" the indicated value, meaning the values take into account experimental error, machine tolerances and other variations that would be expected by a person having ordinary skill in the art. It should also be understood that the precise numerical values used in the specification and claims constitute specific embodiments.

Furthermore, in the following discussion and in the claims, the terms "including" and "comprising" are used in an open-ended fashion, and thus should be interpreted to mean "including, but not limited to."

The term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise. For example, embodiments using "an optical density difference" includes embodiments where one, two, or more optical density differences are used, unless specified to the contrary or the context clearly indicates that only one optical density difference is used.

Subsurface corrosion monitoring is a necessity that has immense repercussions on the well production and lifecycle. Digital Corrosion Analytics & Predictions (DiCAP) can transform well-level manual corrosion monitoring and intervention to field-level corrosion monitoring and prediction resulting in real-time remedial and workover decisions. Well information and history, along with corrosion logging data can be automatically extracted from interpretation reports to a single datasheet. The single datasheet can form the backbone of the DiCAP system that can include, but is not limited to, a field/formation wise corrosion heatmap, progress of corrosion through time, maximum metal loss against depth, as well as the top 5, 10, 15, or more hotspots within each well. The interpretation reports of individual wells can be visualized inside a dashboard for in-depth investigation. The dashboard can display, interpret, and/or otherwise present information provided by the interpretation reports to assist a user. For example, in some embodiments, the dashboard can assist the user in determining an operational plan for a well and/or for determining an operation plan for at least one new well.

One aspect of DiCAP can be an innovative risk metric that can forecast the progression of corrosion using a machine learning algorithm. The machine learning algorithm can utilize a time series machine learning algorithm to predict the dynamic corrosion rate, future metal loss, estimated service lifetime of each well, and the like, and/or any combination thereof. Data pertaining to factors that can drive corrosion can be or can include, but is not limited to, well age, well location, lithology, injection/production rates, salinity, pressure, temperature, $H_2S$ percentage, and $CO_2$ percentage. The factors that drive corrosion can be vital inputs to the machine learning model along with time lapse corrosion metal loss data acquired through mechanical, ultrasonic, electromagnetic logging tools, or the like, and/or any combination thereof.

The corrosion monitoring dashboard can provide insights into a sensitivity of corrosion rate based on different environmental variables to identify the primary causative factors to plan workover, remedial, mitigation, or other measures. The corrosion monitoring dashboard can include a user interface that can include filters based on type of casing, type of field, type of formation, type of well, intervention, and/or well history to allow a focused analysis.

In one or more embodiments, the process can include automation of corrosion log data entry. The process can also include connecting corrosion log data entry to the corrosion monitoring dashboard. The process can also transform this corrosion data into insights with visualizations on data analytics platform. The insights and visualizations can be any user-friendly infographic, display, chart, graph, map, text, pop-up, and/or any other user-friendly corrosion monitoring dashboard method for displaying insights and visualizations of data. In one or more embodiments, the process can include a data ingestion pipeline that can automatically ingest new data into the machine learning workflow. The machine learning workflow can include domain defined data cleaning and preparation algorithms. The data cleaning and preparation algorithms can have functions that include, but are not limited to, cleaning input logs, removing outliers or null values, ignoring intervals where data type and/or flow can be affected by large amounts of information, or any combination thereof.

In one or more embodiments, the corrosion monitoring dashboard can contain information like present metal loss, insight on corrosion rate, hotspots of corrosion, future prediction of metal loss, and/or estimated service lifetime of each well, and/or any combination thereof. In one or more embodiments, the corrosion monitoring dashboard can provide insights into the sensitivity of corrosion rate to different environmental variables. The different environmental variables can be used to identify the primary causative factors to plan workover, remedial action, and/or other mitigation measures.

In one or more embodiments, the machine learning algorithm can incorporate a hybrid of physics and data-driven approaches while also incorporating one or more corrosion factors that can affect corrosion rate. Corrosion factors can be or can include, but are not limited to, age, well location, lithology, injection/production rates, salinity, pressure, temperature, completion quality, presence of nearby aquifer, presence of cement behind casing, fluid type in borehole, presence of external coating, such as an anti-corrosion coating or protective layer, $H_2S$ percentage, $CO_2$ percentage, or any combination thereof. The corrosion factors can be input features to the process along with the time lapse corrosion metal loss data acquired through mechanical, ultrasonic, and/or electromagnetic logging tools. In some embodiments, integrated time-lapse corrosion and metal loss data acquired through well logging can enhance a confidence level within the process. In one or more embodiments, the input features can be selected through an iterative process. The machine learning model can include hyperparameters and weightage of each input feature, defined by the user, weighted automatically by any appropriate algorithm, and/or a combination thereof.

FIG. 1 depicts an illustrative flow diagram of a process 100 for monitoring downhole corrosion, according to one or more embodiments. In some embodiments, the process 100 can include the use of existing data 110, an automatic ingestion workflow 120, a singular unified database or simply a repository 130, and a dashboard 140. The process 100 can also include data preparation 131, a machine learning model 132, and a corrosion prediction 133.

The existing data 110 can be or can include, but is not limited to, one or more intervention and/or completion reports 111, one or more corrosion logs 112, well data 113, such as temperature, lithology, salinity, and the like, one or more flow rate and/or concentration reports 114, such as production rates, injection rates, $CO_2$ concentration, $H_2S$ concentration, and the like, and/or any other existing data related to wells, fields, corrosion, and the like. In one or more embodiments, the existing data 110 can include two or more of: an age of the well, a location of the well, a lithology of the well, injection rates into the well, production rates recovered from the well, a salinity within the well, a pressure within the well, a temperature within the well, a completion quality of the well, a presence of a nearby aquifer, a presence of cement behind a casing in the well, a fluid type in a borehole of the well, a presence of an external coating, a $H_2S$ concentration in the well, a $CO_2$ concentration in the well, and the like, and/or any combination thereof.

In some embodiments, the existing data 110 can include logging data acquired from one or more mechanical tools, one or more ultrasonic tools, one or more electromagnetic tools, and the like, and/or any combination thereof. In some embodiments, the mechanical tool can be or can include, but is not limited to, multi-finger caliper (MFC) tools and/or multi-finger inspection tools (MIT). Such tools can include rigid metal fingers that can extend against the inner pipe wall and can provide high resolution measurements of the radius or diameter of the pipe.

The automatic ingestion workflow 120 can include new data 121 and model retraining 122. The new data 121 can be any type of data related to wells, fields, corrosion, and the like, such as those shown in existing data 110. The repository 130 can be configured to receive information from the existing data 110 and the automatic ingestion workflow 120. In one or more embodiments, the repository 130 can receive incoming data from either the existing data 110, the automatic data ingestion workflow 120, or both, to store the available information in a single location for use in the process. The repository 130 can be configured to transfer data to the model retraining 122, data preparation 131, and/or the dashboard 140. In some embodiments, the repository 130 can be updated using a new plurality of corrosion factors and/or a new plurality of corrosion loss logs.

In some embodiments, the repository 130 can be an optional component in the process 100. In such embodiments, the existing data 110 and the new data 121 can be directed to the data preparation 131 and/or the dashboard 140. However, the repository 130 can reduce the complexity and help ensure easier data-management for long term deployment or operation of the process 100.

The data preparation 131 can include data cleaning, data manipulation, unit conversions, numerical adjustments, numerical biasing, time normalization, and the like, and/or any combination thereof to prepare incoming data for use by another step or function in the process 100. The data preparation 131 can be configured to transfer prepared data to the machine learning model 132, the dashboard 140, or both. Data cleaning can include criteria to remove invalid data within the data itself or derived values. Data manipulation can include criteria to adjust inconsistencies, drift, skew, and/or other errors associated with data transfer and/or data measurement. Time normalization can include processing specific time-lapse corrosion logs to ensure each subsequent log provides consistent data and does not hide and/or exaggerate time-based data progress, such as, but not limited to, any progress of metal loss/corrosion. In one or more embodiments, data preparation 131 can include resolving inconsistencies in file naming standards and/or unit systems, sorting available data, categorizing data in terms of accuracy and/or output info.

The machine learning model 132 can be configured to receive data from the data preparation 131 and/or the model retraining 122. The machine learning model 132 can be configured to process the data provided thereto into a corrosion prediction 133, where the corrosion prediction 133 can include absolute mass loss due to corrosion, relative mass loss due to corrosion, rate of corrosion, concentration of corrosion, area of corrosion, time-to-failure predictions, and the like, and/or any combination thereof. In some embodiments, the corrosion prediction 133 can include a present percentage of metal loss by mass, a dynamic corrosion rate, a future percentage of metal loss by mass, an estimated service lifetime of the at least one well, or a combination thereof. The corrosion prediction 133 can be configured to transfer data to the dashboard 140.

The dashboard 140 can be configured to display information to a user from the repository 130, data preparation 131, and/or corrosion prediction 133, in the form of insights, corrosion heat maps, corrosion hotspots, primary causative factors, risk profiles, and the like, and/or any combination thereof. Insights can include user defined and/or interpreted conclusions, reasonings, and/or outputs that result from data analysis provided by the repository 130, data preparation 131, and/or corrosion prediction 133. Heat maps can include an actual map showing the spread/severity of corrosion overview across one or more locations and/or directions in the field and/or reservoir. Hotspots can include a near precise and/or precise depth at each well where corrosion is the highest.

In one or more embodiments, the machine learning model 132 can include any appropriate model for accurately processing corrosion related data and predicting corrosion factors. In some embodiments, the machine learning model 132 can provide a ranking of the corrosion factors according to a contribution value of the corrosion factors. In some embodiments, the machine learning model 132 can include user defined and/or controlled input weights. In some embodiments, the machine learning model 132 can include long short-term memory (LSTM), autoregressive integrated moving average (ARIMA), Prophet forecasting, recurrent convolutional neural network (R-CNN), and the like. In one or more embodiments, the machine learning model 132 can be an R-CNN model.

In some embodiments, the machine learning model 132 can utilize historical values of metal loss from different tools, with other input variables, e.g., the existing data 110, and can forecast the future metal loss values therefrom. The machine learning model 132 can self-correct via the introduction of the new data 121 in combination with data drift being observed in the machine learning model 132. Said another way, the machine learning model 132 can be built based on the existing data 110 and the new data 121 can become available at after the initial build of the machine learning model 132 that can be used to update the machine learning model 132. The machine learning model 132 can be validated through assessment of model metrics and in the absence of new data feeding in to impact the pattern or rate of metal loss, it can be assumed that the machine learning model 132 behavior can remain the same. In one or more embodiments, the machine learning model 132 can include weights and biases that are fine-tuned by the machine learning model 132 itself and/or user input.

In one or more embodiments, the process 100 can be used to determine an operational plan for at least one well. The corrosion prediction 133 displayed on the dashboard 140 can inform a user and/or automatically prescribe one or more operational plans for at least one well. The operational plan can include well remediation, well repair, well workover, well sampling, well monitoring, and the like, and/or any combination thereof, and scheduling and planning to do the same. In one or more embodiments, the operational plan can be carried out by one or more users for at least one well in order to prevent well failure, minimize corrosion damage, eliminate corrosion effects, minimize well downtime, plan production deferment, plan logistics and material supply, and the like, and/or any combination thereof. In one or more embodiments, the process 100 can be used to determine an operational plan for at least one new well.

Figure 2:
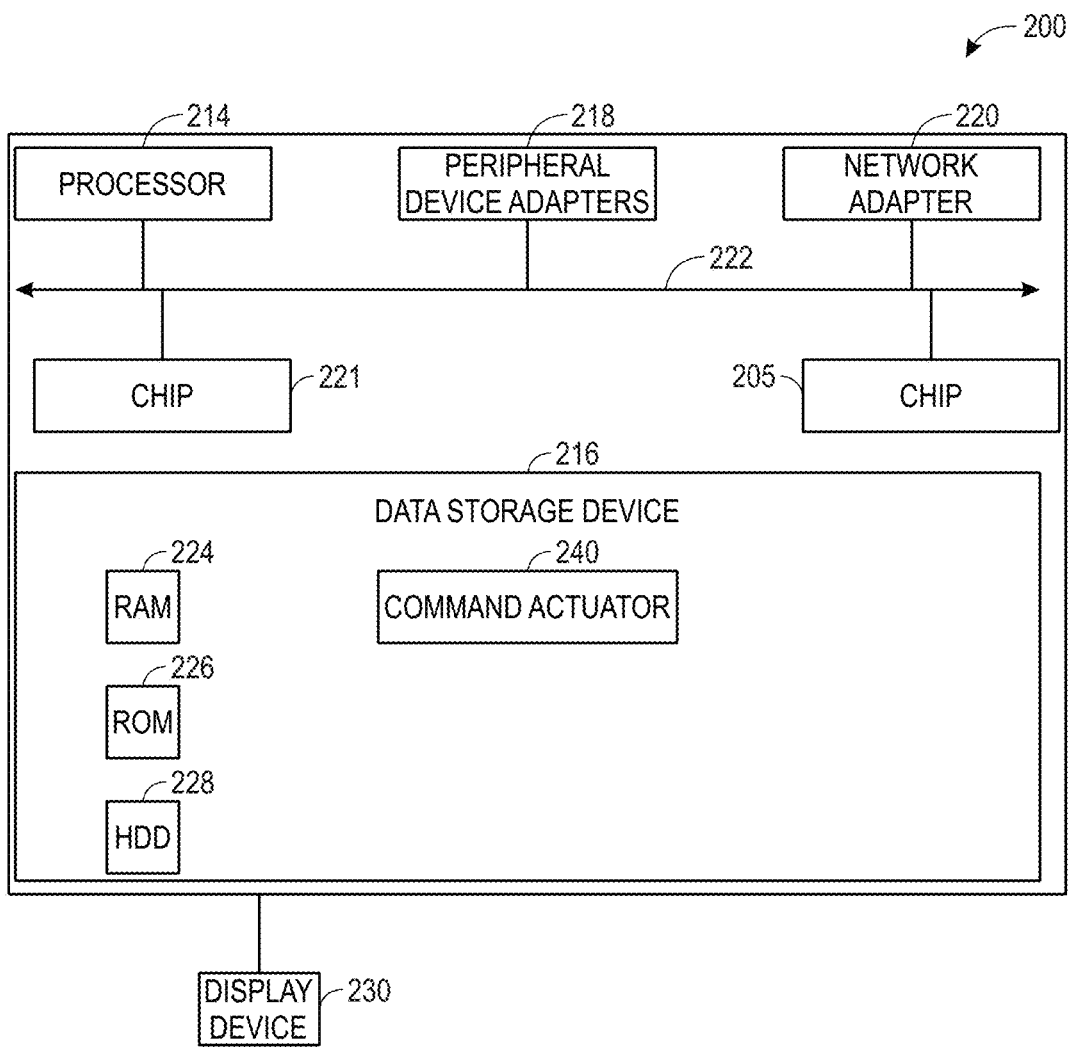
FIG. 2 depicts a schematic of an illustrative computing system that can be configured to carry out one or more steps in the flow diagram depicted in FIG. 1, according to one or more embodiments described.

FIG. 2 depicts a schematic of an illustrative computing system 200 that can be configured to carry out one or more steps in the process flow diagram depicted in FIG. 1, according to one or more embodiments. The computer system 200 can be located within a facility or can be located elsewhere. One or more chips, for example chips 205 and/or 221, can be or can include field-programmable gate arrays ("FPGAs"), application specific integrated circuits ("ASICs"), chiplets, Multi-Chip-Modules, central processing units ("CPUs"), and/or system-on-chips ("SOCs"), to name a few. The chip can be used in a wide-range of applications, including but not limited to image processing, input data organization, or other digital processing systems. The ASICs can include entire microprocessors, memory blocks including read only memory (ROM), random access memory (RAM), erasable programmable read only memory (EPROM), electrically erasable programmable read only memory (EEPROM), flash memory and other building blocks and can be known as system-on-chip ("SoC").

To achieve its desired functionality, the computing system 200 can include various hardware and software components. Among these components can be one or more processors 214 and a command actuator 240. These hardware components can be interconnected through the use of a number of electrical connections, buses, and/or network connections. In one embodiment, the processor 214, the chip 205, the chip 221, and the command actuator 240 can be communicatively coupled via a bus 222. The bus 222 can be or include any know computing system bus. The command actuator 240 can be internal to a data storage device 216.

The chip 205, the chip 221, and/or the command actuator 240 can include, either separately or in some combination, software and hardware, including tangible, non-transitory computer readable medium (not shown), for performing corrosion analysis. In some embodiments, the corrosion analysis can be interpreted via statistical formulas, such as average mean, median, standard deviation, and the like, or any combination thereof, and/or complex formulas, such as factor analysis, Fourier's transform, logarithmic methods, and the like, or any combination thereof.

Other known algorithms and/or suitable algorithms developed in the future can also be used. In some embodiments, the command actuator 240 can be integrated into the chip 205, the chip 221, and/or the processor 214. In some embodiments, the chip 205 and/or the chip 221 can be integrated into the processor 214. Although the command actuator 240 is depicted as being internal to the data storage device 216, in other embodiments, the command actuator 240 can be a peripheral device (not shown) coupled to the computing system 200 or included within a peripheral device (not shown) coupled to the computing system 200.

The command actuator 240 can include instructions that when executed by the command actuator 240 can cause the command actuator 240 to implement at least the functionality of receiving information through a network adapter, processing the information from two or more downhole logs through the processor according to the instructions stored in the memory to create a command, and for performing corrosion analysis according to the command. In some embodiments, the instructions can, when executed by the command actuator 240, cause the command actuator 240 to use one or more inversion procedures or techniques to perform corrosion analysis using the information received. In some embodiments, the instructions can, when executed by the command actuator 240, cause the command actuator 240 to use one or more analyses to determine the corrosion analysis using the one or more models.

In one or more embodiments, the command actuator 240 can work in conjunction with the processor 214 to implement the functionality described above. In some embodiments, the command actuator 240 can execute firmware code stored on the computing system 200, such as on the chip 205, the chip 221, and/or the processor 214. The functionality of the computing system 200 and/or the command actuator 240 can be in accordance with the processes of the present specification described herein. In the course of executing code, the processor 214 and/or the command actuator 240 can receive input from and provide output to a number of the remaining hardware units.

The computing system 200 can be implemented in an electronic device. Examples of electronic devices include servers, desktop computers, laptop computers, cloud-based computers, personal digital assistants ("PDAs"), mobile devices, smartphones, gaming systems, and tablets, among other electronic devices. The computing system 200 can be utilized in any data processing scenario including, stand-alone hardware, mobile applications, through a computing network, or combinations thereof. Further, the computing system 200 can be used in a computing network, a public cloud network, a private cloud network, a hybrid cloud network, other forms of networks, or combinations thereof. In one example, the processes provided by the computing system 200 can be provided as a service by a third party.

To achieve its desired functionality, the computing system 200 can include various other hardware components. Among these other hardware components can be a number of data storage devices or tangible, non-transitory computer readable medium, a number of peripheral device adapters 218, and a number of network adapters 220. These hardware components can be interconnected through the use of a number of electrical connections, busses, and/or network connections.

The chip 205, the chip 221, and/or the processor 214 can include the hardware and/or firmware/software architecture to retrieve executable code from the data storage device 216 and execute the executable code. The executable code can, when executed by the chip 205, the chip 221, and/or the processor 214, cause the chip 205, the chip 221, and/or the processor 214 to implement at least the functionality of receiving information through a network adapter, processing the information from the two or more downhole logs and performing corrosion analysis according to the command.

The data storage device 216 can store data such as executable program code that is executed by the processor 214, the command actuator 240, or other processing devices. The processor 214 can be a central processing unit that is to execute an operating system in the computing system 200. As will be discussed, the data storage device 216 can specifically store computer code representing a number of applications that the processor 214 and/or the command actuator 240 can execute to implement at least the functionality described herein.

In one or more embodiments, the data storage device 216 can include various types of memory modules, including volatile and nonvolatile memory. In one or more embodiments, the data storage device 216 of the present example can include Random Access Memory ("RAM") 224, Read Only Memory ("ROM") 226, and Hard Disk Drive ("HDD") storage 228. Many other types of memory can also be utilized, and the present specification contemplates the use of many varying type(s) of memory in the data storage device 216 as can suit a particular application of the principles described herein. In certain examples, different types of memory in the data storage device 216 can be used for different data storage requirements. In one or more embodiments, in certain examples the processor 214 can boot from Read Only Memory ("ROM") 226, maintain nonvolatile storage in the Hard Disk Drive ("HDD") memory 228, and execute program code stored in Random Access Memory ("RAM") 224. In examples, the chip 205, and the chip 221 can boot from the Read Only Memory ("ROM") 226.

The data storage device 216 can include a computer readable medium, a computer readable storage medium, or a non-transitory computer readable medium, among others. In one or more embodiments, the data storage device 216 can be an electronic, magnetic, optical, electromagnetic, infrared, or semiconductor system, apparatus, or device, or any suitable combination of the foregoing. More specific examples of the computer readable storage medium can include, for example, the following: an electrical connection having a number of wires, a portable computer diskette, a hard disk, a RAM, a ROM, an EPROM, a Flash memory, a portable compact disc read only memory ("CD-ROM"), an optical storage device, a magnetic storage device, or any suitable combination of the foregoing. In the context of this document, a computer readable storage medium can be any tangible medium that can contain, or store computer usable program code for use by or in connection with an instruction execution system, apparatus, or device. In another example, a computer readable storage medium can be any non-transitory medium that can contain or store a program for use by or in connection with an instruction execution system, apparatus, or device.

The hardware adapters 218, 220 in the computing system 200 can enable the processor 214 to interface with various other hardware components, external and internal to the computing system 200. In one or more embodiments, the peripheral device adapters 218 can provide an interface to input/output devices, such as, for example, a display device 230, a mouse, and/or a keyboard. The peripheral device adapters 218 can also provide access to other external devices such as an external storage device, a number of network devices such as, for example, servers, switches, and routers, client devices, other types of computing devices, and combinations thereof.

The display device 230 can be provided to allow a user of the computing system 200 to interact with and implement the functionality of the computing system 200. Examples of display devices 230 can include a computer screen, a laptop screen, a mobile device screen, a personal digital assistant ("PDA") screen, and/or a tablet screen, among other display devices 230.

The peripheral device adapters 218 can also create an interface between the processor 214 and the display device 230, a printer, or other media output devices. The network adapter 220 can provide an interface to other computing devices within, for example, a network, thereby enabling the transmission of data between the computing system 200 and other devices located within the network. The network adapter 220 can provide an interface to an external telecommunications network such as a cellular phone network or other radio frequency enabled network, thereby enabling the transmission of data between the computing system 200 and other external devices such as an external storage device, a number of network devices such as, for example, servers, switches, and routers, client servers, radio frequency enabled devices, other client devices, other types of computing devices, and combinations thereof.

The computing system 200 can further include a number of modules used in the implementation of the process and systems described herein. The various modules within the computing system 200 can include executable program code that can be executed separately. In this example, the various modules can be stored as separate computer program products. In another example, the various modules within the computing system 200 can be combined within a number of computer program products; each computer program product including a number of the modules.

In one or more embodiments, the process can be used to determine an operational plan for at least one well. The corrosion prediction 133 displayed on the dashboard 140 can inform a user and/or automatically prescribe one or more operational plans for at least one well. The operational plan can include well remediation, well repair, well workover, well sampling, well monitoring, and the like, and/or any combination thereof, and scheduling and planning to do the same. In one or more embodiments, the operational plan can be carried out by one or more users for at least one well in order to prevent well failure, minimize corrosion damage, eliminate corrosion effects, minimize well downtime, and the like, and/or any combination thereof.

The present disclosure further relates to any one or more of the following numbered embodiments:

A1. A process, comprising: acquiring a plurality of corrosion factors for at least one well; acquiring a plurality of corrosion loss logs for the at least one well; providing the plurality of corrosion factors and the plurality of corrosion loss logs to a repository; providing the repository to a machine learning model to generate a corrosion prediction; combining at least the plurality of corrosion factors, the plurality of corrosion loss logs, and the corrosion prediction into a user dashboard; using the user dashboard to determine an operational plan for the at least one well; and carrying out the determined operational plan for the at least one well.

A2. The process of paragraph A1, wherein the plurality of corrosion factors comprise two or more of: an age of the well, a location of the well, a lithology of the well, injection rates into the well, production rates recovered from the well, a salinity within the well, a pressure within the well, a temperature within the well, a completion quality of the well, a presence of a nearby aquifer, a presence of cement behind a casing in the well, a fluid type in a borehole of the well, a presence of an external coating, a $H_2S$ concentration in the well, and a $CO_2$ concentration in the well.

A3. The process of paragraph A1 or paragraph A2, wherein the plurality of corrosion loss logs includes time lapse loss data.

A4. The process of any one of paragraphs A1 to A3, wherein the plurality of corrosion loss logs comprises logging data acquired from one or more mechanical tools, one or more ultrasonic tools, one or more electromagnetic tools, or a combination thereof.

A5. The process of any one of paragraphs A1 to A4, wherein the machine learning model comprises a retraining model to update the machine learning model using one or more changes to the repository and/or using direct data input.

A6. The process of any one of paragraphs A1 to A5, wherein the repository is updated using a new plurality of corrosion factors and/or a new plurality of corrosion loss logs from the at least one well or from at least one additional well.

A7. The process of any one of paragraphs A1 to A6, wherein the corrosion prediction comprises a present percentage of metal loss by mass, a dynamic corrosion rate, a future percentage of metal loss by mass, an estimated service lifetime of the at least one well, or a combination thereof.

A8. The process of any one of paragraphs A1 to A7, wherein the user dashboard comprises insights, corrosion heatmaps, corrosion hotspots, primary causative factors, and/or a risk profile based on the plurality of corrosion factors.

A9. The process of any one of paragraphs A1 to A8, wherein combining at least the plurality of corrosion factors and the plurality of corrosion loss logs further comprises data cleaning, data preparation, time normalization, or a combination thereof.

A10. The process of any one of paragraphs A1 to A9, wherein the determined operational plan comprises at least one of planning a well workover, planning a well remediation, planning a corrosion mitigation operation, planning a well completion, and/or planning a well operation schedule.

A11. The process of any one of paragraphs A1 to A10, wherein the machine learning model comprises user defined and controlled input weights.

A12. The process of any one of paragraphs A1 to A11, wherein the machine learning model provides a ranking of the corrosion factors according to a corrosion contribution value.

B1. A process for predicting corrosion to complete a new well, the process comprising: acquiring a plurality of corrosion factors for at least one well; acquiring a plurality of corrosion loss logs for the at least one well; providing the plurality of corrosion factors and the plurality of corrosion loss logs to a repository; providing the repository to a machine learning model to generate a corrosion prediction; combining at least the plurality of corrosion factors, the plurality of corrosion loss logs, and the corrosion prediction into a user dashboard; using the user dashboard to determine an operational plan for at least one new well; and completing the at least one new well using the determined operational plan.

B2. The process of paragraph B1, wherein the plurality of corrosion factors comprise two or more of: an age of the well, a location of the well, a lithology of the well, injection rates into the well, production rates recovered from the well, a salinity within the well, a pressure within the well, a temperature within the well, a completion quality of the well, a presence of a nearby aquifer, a presence of cement behind a casing in the well, a fluid type in a borehole of the well, a presence of an external coating, a H2S concentration in the well, and a CO2 concentration in the well.

B3. The process of paragraphs B1 or paragraph B2, wherein the plurality of corrosion loss logs includes time lapse loss data.

B4. The process of any one of paragraphs B1 to B3, wherein the corrosion prediction comprises a present percentage of metal loss by mass, a dynamic corrosion rate, a future percentage of metal loss by mass, an estimated service lifetime of the at least one well, or a combination thereof.

B5. The process of any one of paragraphs B1 to B4, wherein the machine learning model comprises a retraining model to update the machine learning model using one or more changes to the repository.

B6. The process of any one of paragraphs B1 to B5, wherein combining at least the plurality of corrosion factors and the plurality of corrosion loss logs further comprises data cleaning, data preparation, time normalization, or a combination thereof.

B7. The process of any one of paragraphs B1 to B6, wherein the machine learning model includes user defined and controlled input weights.

B8. The process of any one of paragraphs B1 to B7, wherein the machine learning model provides a ranking of the corrosion factors according to a corrosion contribution value.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A process, comprising:

acquiring a plurality of corrosion factors for at least one well;

acquiring a plurality of corrosion loss logs for the at least one well, wherein the plurality of corrosion loss logs includes time lapse corrosion metal loss data;

providing the plurality of corrosion factors and the plurality of corrosion loss logs to a repository;

generating prepared data by cleaning, manipulating, converting, adjusting, biasing, or providing time normalization to the plurality of corrosion factors and the plurality of corrosion loss logs of the repository;

providing the prepared data to a machine learning model, wherein the machine learning model comprises a retraining model that in operation updates the machine learning model using one or more changes to the repository and/or using direct data input to the machine learning model, wherein updating the machine learning model via the retraining model further comprises utilizing new data comprising the one or more changes to the repository and/or the direct data input to the machine learning model in combination with data drift observed in the machine learning model to self-correct the machine learning model;

generating a corrosion prediction via the machine learning model utilizing the prepared data;

combining at least the plurality of corrosion factors, the plurality of corrosion loss logs, and the corrosion prediction into a user dashboard, wherein the user dashboard comprises:

a user interface that includes filters based on a type of casing, a type of field, a type of formation, a type of well, an intervention, or a well history to allow for a focused analysis;

insights into a sensitivity of corrosion rate to different environmental variables;

corrosion heatmaps comprising an indication corresponding to a spread of corrosion or a severity of corrosion overview across one or more locations in a field corresponding to the at least one well or a reservoir corresponding to the at least one well;

corrosion hotspots comprising a second indication of a depth of the at least one well where the corrosion is the highest in the at least one well;

primary causative factors; and a risk profile;

using the user dashboard to determine an operational plan for the at least one well; and carrying out the operational plan for the at least one well.

2. The process of claim 1, wherein the plurality of corrosion factors comprise two or more of: an age of the well, a location of the well, a lithology of the well, injection rates into the well, production rates recovered from the well, a salinity within the well, a pressure within the well, a temperature within the well, a completion quality of the well, a presence of a nearby aquifer, a presence of cement behind a casing in the well, a fluid type in a borehole of the well, a presence of an external coating, a $H_2S$ concentration in the well, and a $CO_2$ concentration in the well.

3. The process of claim 1, wherein the plurality of corrosion loss logs comprises logging data acquired from one or more mechanical tools, one or more ultrasonic tools, one or more electromagnetic tools, or a combination thereof.

4. The process of claim 1, wherein the repository is updated using a new plurality of corrosion factors and/or a new plurality of corrosion loss logs from the at least one well or from at least one additional well.

5. The process of claim 1, wherein the corrosion prediction comprises a present percentage of metal loss by mass, a dynamic corrosion rate, a future percentage of metal loss by mass, an estimated service lifetime of the at least one well, or a combination thereof.

6. The process of claim 1, further comprising utilizing the different environmental variables to identify primary causative factors to plan a well workover, plan a remedial action at the well, or plan other mitigation measures as the operational plan for the at least one well.

7. The process of claim 1, wherein the operational plan comprises at least one of planning a well workover, planning a well remediation, planning a corrosion mitigation operation, planning a well completion, and planning a well operation schedule.

8. The process of claim 1, wherein the machine learning model comprises user defined and controlled input weights.

9. The process of claim 1, wherein the machine learning model provides a ranking of the corrosion factors according to a corrosion contribution value.

10. The process of claim 1, further comprising:

using the user dashboard to determine a second operational plan for at least one new well; and completing the at least one new well using the second operational plan.

11. A process for predicting corrosion to complete a new well, the process comprising:

acquiring a plurality of corrosion factors for at least one well;

acquiring a plurality of corrosion loss logs for the at least one well, wherein the plurality of corrosion loss logs includes time lapse corrosion metal loss data;

providing the plurality of corrosion factors and the plurality of corrosion loss logs to a repository;

generating prepared data by cleaning, manipulating, converting, adjusting, biasing, or providing time normalization to the plurality of corrosion factors and the plurality of corrosion loss logs of the repository;

providing the prepared data to a machine learning model;

generating a corrosion prediction via the machine learning model utilizing the prepared data;

combining at least the plurality of corrosion factors, the plurality of corrosion loss logs, and the corrosion prediction into a user dashboard, wherein the user dashboard comprises:

a user interface that includes filters based on a type of casing, a type of field, a type of formation, a type of well, an intervention, or a well history to allow for a focused analysis;

insights into a sensitivity of corrosion rate to different environmental variables;

corrosion heatmaps comprising an indication corresponding to a spread of corrosion or a severity of corrosion overview across one or more locations in a field corresponding to the at least one well or a reservoir corresponding to the at least one well;

corrosion hotspots comprising a second indication of a depth of the at least one well where the corrosion is the highest in the at least one well;

primary causative factors; and a risk profile;

using the user dashboard to determine an operational plan for at least one new well; and completing the at least one new well using the operational plan.

12. The process of claim 11, wherein the plurality of corrosion factors comprise two or more of: an age of the well, a location of the well, a lithology of the well, injection rates into the well, production rates recovered from the well, a salinity within the well, a pressure within the well, a temperature within the well, a completion quality of the well, a presence of a nearby aquifer, a presence of cement behind a casing in the well, a fluid type in a borehole of the well, a presence of an external coating, a $H_2S$ concentration in the well, and a $CO_2$ concentration in the well.

13. The process of claim 11, wherein the corrosion prediction comprises a present percentage of metal loss by mass, a dynamic corrosion rate, a future percentage of metal loss by mass, an estimated service lifetime of the at least one well, or a combination thereof.

14. The process of claim 11, wherein the machine learning model comprises a retraining model that in operation updates the machine learning model using one or more changes to the repository.

15. The process of claim 11, wherein the machine learning model includes user defined and controlled input weights.

16. The process of claim 11, wherein the machine learning model provides a ranking of the corrosion factors according to a corrosion contribution value.

17. The process of claim 11, further comprising utilizing the different environmental variables to identify primary causative factors to plan at least one of a workover, a remedial action, or other mitigation measures as the operational plan for the at least one new well.

* * * * *